(12) United States Patent  
Campbell et al.

(10) Patent No.: US 9,623,644 B2
(45) Date of Patent: Apr. 18, 2017

(54) PROFILED COATINGS FOR ENABLING VACUUMLESS LAMINATION OF STENCIL PRINTED LIQUID OPTICALLY CLEAR ADHESIVES

(71) Applicant: 3M INNOVATIVE PROPERTIES COMPANY, St. Paul, MN (US)

(72) Inventors: Christopher J. Campbell, Burnsville, MN (US); Karl K. Stensvad, Inver Grove Heights, MN (US); Jonathan J. O'Hare, Oakdale, MN (US); Daniel H. Carlson, Arden Hills, MN (US); Glen A. Jerry, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 616 days.

(21) Appl. No.: 14/135,999

(22) Filed: Dec. 20, 2013

(65) Prior Publication Data

US 2015/0174880 A1 Jun. 25, 2015

(51) Int. Cl.
*B32B 37/12* (2006.01)
*B32B 37/16* (2006.01)
(Continued)

(52) U.S. Cl.
CPC ...... *B32B 37/1292* (2013.01); *B32B 37/0076* (2013.01); *B32B 37/16* (2013.01); *B32B 38/0012* (2013.01); *B32B 38/145* (2013.01); *C09J 5/00* (2013.01); *B32B 37/003* (2013.01); *B32B 37/0007* (2013.01); *B32B 37/0023* (2013.01); *B32B 2307/412* (2013.01); *B32B 2398/00* (2013.01); *B32B 2457/20* (2013.01)

(58) Field of Classification Search
CPC ............ B32B 37/0076; B32B 2398/00; B32B 2307/412; B32B 38/145; B32B 37/16; B32B 37/1292; B32B 2457/20; B32B 38/0012; B32B 37/0007; B32B 37/0023; B32B 37/003; C09J 5/00
See application file for complete search history.

(56) References Cited

U.S. PATENT DOCUMENTS 6,540,833 B1 4/2003 Gibson
7,169,229 B2 1/2007 Gibson
(Continued)

FOREIGN PATENT DOCUMENTS

DE 102006053916 B3 * 6/2008 ................ C09J 5/00
JP 11-128805 5/1999
(Continued)

OTHER PUBLICATIONS

Kevra, "Estimation of Shear Rates During Rolling in the Screening and Stenciling Process", The International Journal for Hybrid Microelectronics, Dec. 1989, vol. 12, No. 4, pp. 188-194.
(Continued)

*Primary Examiner* — Jacob T Minskey
*Assistant Examiner* — Vishal I Patel

(57) ABSTRACT

A method of stencil printing includes printing a layer of non-sag adhesive onto a first substrate, adding topography to the layer of non-sag adhesive, and contacting the layer of non-sag adhesive with a second substrate. The second substrate initially contacts only about 5% or less of exposed surface area of the layer of non-sag adhesive.

16 Claims, 2 Drawing Sheets

(51) Int. Cl.
*B32B 38/00* (2006.01)
*C09J 5/00* (2006.01)
*B32B 37/00* (2006.01)

(56) References Cited

U.S. PATENT DOCUMENTS

| | | |
|---|---|---|
| 2004/0080075 A1 | 4/2004 | Pekurovsky |
| 2006/0068113 A1 | 3/2006 | Aoyama |
| 2009/0183819 A1 | 7/2009 | Matsuhira |
| 2009/0194021 A1 | 8/2009 | Snodgrass |
| 2009/0215351 A1 | 8/2009 | Kobayashi |
| 2013/0271828 A1 | 10/2013 | Everaerts |

FOREIGN PATENT DOCUMENTS

| | | |
|---|---|---|
| JP | 2000-051771 | 2/2000 |
| JP | 2001-137764 | 5/2001 |
| JP | 2007-152261 | 6/2007 |
| JP | 2007-167791 | 7/2007 |
| WO | 2011-119828 | 9/2011 |
| WO | 2012-036980 | 3/2012 |
| WO | WO 2012/087804 | 6/2012 |
| WO | 2013-049133 | 4/2013 |

OTHER PUBLICATIONS

Gilleo, "Rheology and Surface Chemistry for Screen Printing", Screen Printing, 1989, pp. 128-132.
International Search Report for International Publication No. PCT/US2014/069469, dated Mar. 26, 2015.

\* cited by examiner

PROFILED COATINGS FOR ENABLING VACUUMLESS LAMINATION OF STENCIL PRINTED LIQUID OPTICALLY CLEAR ADHESIVES

FIELD OF THE INVENTION

The present invention is related generally to stencil printing. In particular, the present invention is a method of stencil printing with vacuumless lamination.

BACKGROUND

Liquid optically clear adhesives (LOCA) are becoming more prevalent in the display industry to fill air gaps between layers or substrates of a display module. For example, LOCAs are commonly used between the coverglass and indium-tin-oxide (ITO) touch sensors (FIG. 1a), between ITO touch sensors and the liquid crystal module (FIG. 1b), or between the coverglass and the liquid crystal module (FIG. 1c). The layers in the display configuration 2 of FIG. 1a includes a glass lens or plastic lens 10, a first liquid optically clear adhesive (LOCA) 12, a first ITO patterned circuit 14a, a double-sided ITO (DITO) glass plate 16, a second ITO patterned circuit 14b, a second LOCA 18, a front polarizer 20, a glass plate 22 and a back polarizer 24. The layers in the display configuration 4 of FIG. 1b includes a glass or plastic lens 26, an anti-splinter (AS) or anti-reflective (AR) coating 28, a LOCA 30, a front polarizer 32, a glass plate 34 and a back polarizer 36. The layers in the display configuration 6 of FIG. 1c includes a glass or plastic lens 38, a LOCA 40, a front polarizer 42, a color filter with ITO circuit 44, a glass plate 46 and a back polarizer 48.

The LOCAs are currently applied using a dispensable fluid or by patterning a thicker, potentially thixotropic, material with the use of a stencil or screen. The use of dispensable fluids involves flowable LOCAs that behave like a Newtonian fluid. To prevent flow beyond the desired printing area, the use of a pre-cured dam material is often required. When the optically clear adhesive is a LOCA, refractive index of the pre-cured dam material must match the refractive index of the LOCA. The use of a pre-cured dam material also involves an additional process step and may still lead to overflow of the LOCA if a precise amount is not dispensed and/or the co-planarity between the two substrates that are being bonded with the LOCA are not perfectly aligned.

The use of a screen for printing a LOCA has been described, for example, in U.S. Patent Application Publication No. 2009/0215351 to Kobayashi et al. The use of a stencil for printing a LOCA has been described, for example, in PCT Publication No. WO 2012/136980. Both methods require passing the LOCA through a screen or a stencil to properly apply the adhesive coating in the desired area on the substrate.

The methods mentioned above require printing and laminating one device at a time. For traditional dam and fill methods using a dispensable fluid, lamination must be done immediately after printing (or within a controlled amount of time after printing) because the LOCA flows over time. Current stencil printing and lamination processes for LOCAs also require vacuum lamination to remove bubbles from the viewing area.

Stencil printing/lamination LOCA equipment is expensive and typically has a Takt (cycle) time of about 60 to 90 seconds. To reduce cost, either the equipment cost per display must be reduced and/or the Takt time must be reduced. The limiting factor in the Takt time is the vacuum lamination step, which is often 2 to 3 times longer than any other step in the process. In addition, a significant amount of the equipment cost can be attributed to the vacuum chamber and pumps associated with it.

SUMMARY

In one embodiment, the present invention is a method of stencil printing. The method includes printing a layer of non-sag adhesive onto a first substrate, adding topography to the layer of non-sag adhesive, and contacting the layer of non-sag adhesive with a second substrate. The second substrate initially contacts only about 5% or less of exposed surface area of the layer of adhesive.

In another embodiment, the present invention is a method of stencil printing. The method includes printing a layer of a non-sag, liquid optically clear adhesive onto a first substrate, adding topography to the layer of the non-sag, liquid optically clear adhesive, and contacting the layer of the non-sag, liquid optically clear adhesive with a second substrate. The topography comprises about 5% or less of an exposed surface area of the layer of the non-sag, liquid optically clear adhesive.

DETAILED DESCRIPTION

Figure 1A:
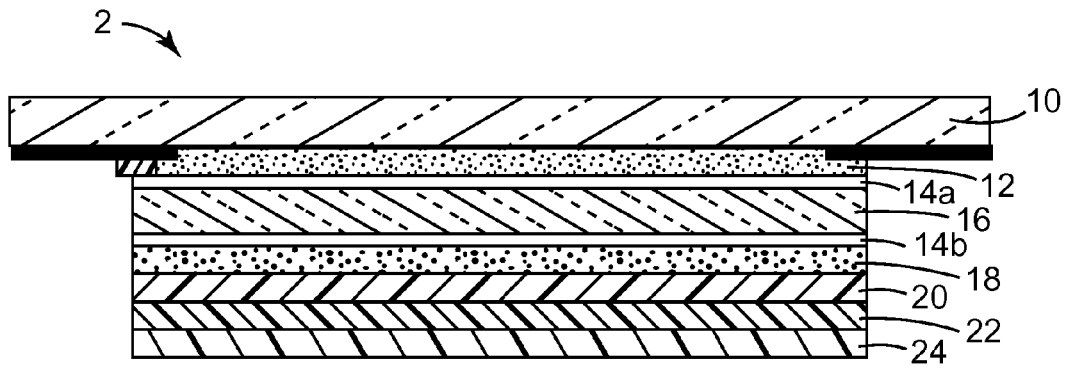
FIG. 1a is a cross-sectional view of a first embodiment of a display configuration including at least one layer of a liquid optically clear adhesive.
Figure 1B:
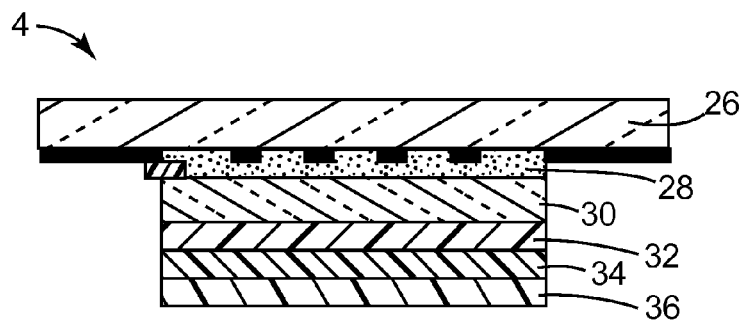
FIG. 1b is a cross-sectional view of a second embodiment of a display configuration including at least one layer of a liquid optically clear adhesive.
Figure 1C:
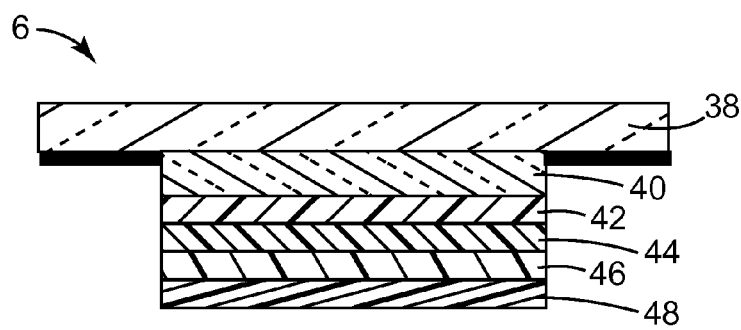
FIG. 1c is a cross-sectional view of a third embodiment of a display configuration including at least one layer of a liquid optically clear adhesive.

The method of the present invention allows an adhesive composition to be stencil printed without the use of a vacuum. Through the stencil, a profiled coating having topography is printed. The profiled coating minimizes the first contact area in lamination and facilitates bleed out of air bubbles during the printing process and/or lamination process, enabling vacuumless lamination. By using the method of the present invention, coating fidelity, processing speed and optimal material use are optimized. A specified amount of adhesive composition is coated within a desired area of a substrate, and the fidelity of that printed area is retained through lamination and curing of the adhesive composition. In one embodiment, the fidelity is retained within less than about 1.0 mm, particularly less than within about 0.5 mm, and more particularly within less than about 0.1 mm in lateral dimensions after lamination and curing. The profiled coating may be made either during an initial stencil printing step and/or during a subsequent post-printing step. In one embodiment, the invention enables the vacuumless lamination of a stencil printed liquid optically clear adhesive for display applications.

Method

The adhesive composition is stencil printed in a process similar to what is described in PCT Application WO2012/036980, which is herein incorporated by reference. Generally, the adhesive composition is first printed onto a surface of a first substrate. In stencil printing, a stencil is placed on the first substrate and the adhesive composition is printed by brushing, spraying, or squeegeeing through the openings of the stencil. The stencil frame may be fabricated from thin metal, plastic or any other material impermeable to the liquid adhesive. Squeegeeing may be used to obtain a smooth and uniformly thick adhesive liquid coating, though in some embodiments a squeegee is not required. In one embodiment, the stencil has only the outer boundary, or perimeter, defined by the metal, plastic or cardboard, leaving the interior of the stencil completely free of metal, plastic or cardboard. Optionally, inner ribs or narrow lengths of metal, plastic or cardboard may span the interior of the stencil from one side to the other for reinforcement of the stencil or to prevent sagging of the squeegee in the interior portions of the stencil. The adhesive composition may be dispensed on the stencil and then spread across the stencil by the squeegee, or the adhesive composition may be deposited on the stencil by dispensing it ahead of a notch bar and moving the notch bar and substrate relative to each to spread the adhesive as a layer on the substrate, without use of a squeegee. During printing, the stencil may be seated directly onto the substrate while the squeegee moves over the stencil to spread the adhesive. As the squeegee moves over the stencil, liquid adhesive is moved over openings in the stencil and gets deposited on the substrate beneath. Thereafter, the stencil is lifted from the substrate, leaving behind the liquid adhesive.

Figure 2:
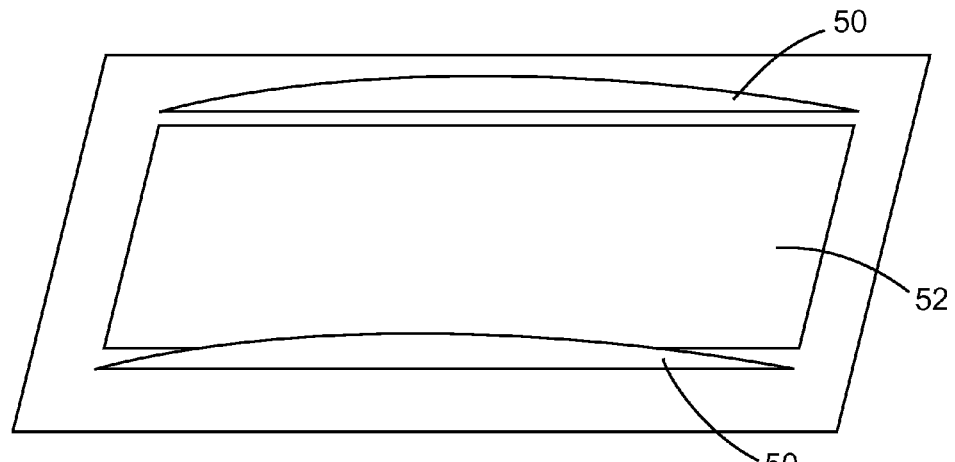
FIG. 2 is a perspective view of a stencil having guides used in a first method of dispensing liquid optically clear adhesive according to the present invention.

There are various embodiments for the printing process that can be utilized to enable vacuumless lamination. In all of the embodiments, the adhesive composition has varying topography to create a profiled coating that minimizes the first contact area in lamination and facilitates bleed out of air bubbles during the lamination process. In a first embodiment of the present invention, during a first pass of printing the stencil printable adhesive composition (described above), the adhesive composition is printed with variation in the z-direction of height over the printing area, creating a profile. As shown in FIG. 2, the profile can be produced, for example, by bringing the slot die over guides 50 bordering or outside of the printing area 52. In another embodiment, the profile can be produced by increasing the height and/or decreasing the stencil speed to apply more adhesive composition in a particular area.

Figure 3A:
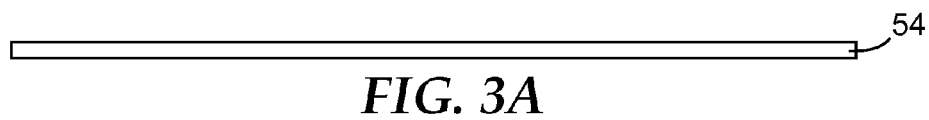
FIG. 3a is a first pass coating profile of a second method of dispensing liquid optically clear adhesive according to the present invention.
Figure 3B:
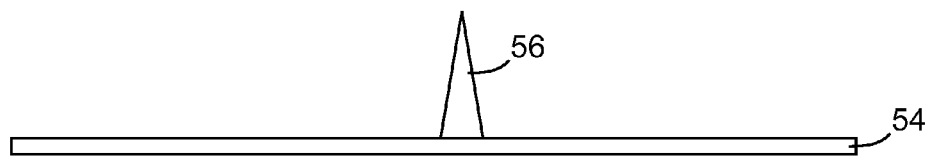
FIG. 3b is a second pass coating profile of a second method of dispensing liquid optically clear adhesive according to the present invention.

In a second embodiment of the present invention, an initial amount of adhesive composition 54 is stencil printed in a first pass (FIG. 3a) with a subsequent amount of adhesive composition 56 added to a specific location on the printed adhesive composition in a second pass (FIG. 3b) in order to add variation in topography. Although FIG. 3b shows the subsequent amount of adhesive composition as a point or peak where the initial contact during lamination would occur, any variation could be printed as long as there is variation in the topography of the coating. For example, the subsequent amount could be a single drop of adhesive composition dispensed from a dispensing needle or a line of adhesive composition dispensed from a slot die or similar apparatus without departing from the intended scope of the present invention.

Figure 4:
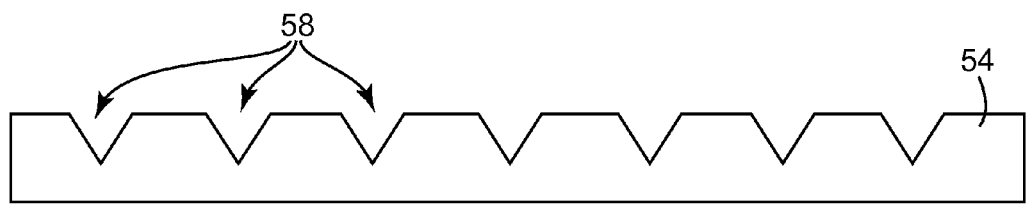
FIG. 4 is a second pass coating profile of a third method of dispensing liquid optically clear adhesive according to the present invention These figures are not drawn to scale and are intended merely for illustrative purposes.

In a third embodiment of the present invention, the adhesive composition is stencil printed in the first pass similar to the second embodiment (and FIG. 3a) of the present invention in which an initial amount of adhesive composition 54 is printed. A draw bar that has a defined profile is then passed over the coating. FIG. 4 shows a cross-sectional view of the resulting coating of adhesive composition. The defined profile would place bleed out channels or grooves 58 in the adhesive composition to add topography to the coating. The channels or grooves 58 enable air bubbles to bleed out during the lamination process. While the cross-sectional profile of the channels is shown as triangles in FIG. 4, the shape of the bar and resulting channels or grooves is not particularly limited and may include any shape, including, but not limited to: triangles, squares, rectangles, semi-circular profiles and the like. In addition, combinations of different profile shapes may also be used.

In all three embodiments described, the variation in topography of the adhesive composition is optimized to minimize the contact area with the adhesive composition during initial contact with the second substrate during lamination. In one embodiment, the initial contact area would be less than about 5% and particularly less than about 2% of the exposed surface area of the adhesive composition.

After the adhesive composition has been printed onto the first substrate with the topography, the adhesive composition is then brought into contact with a surface of a second substrate. As mentioned above, contact between the adhesive composition and the surface of the second substrate is initially less than about 5% of the exposed surface area of the adhesive composition and particularly less than about 2% of the exposed surface area of the adhesive composition. After the initial contact, the first and second substrates are moved closer to one another. The variation in the topography enables bleed out of any air bubbles that were present during the printing process. Once the first and second substrates are positioned relative to one another as desired with the adhesive composition positioned in between, the adhesive composition is cured to yield an adhesive layer. Due to the bleed out of air caused by the variation in topography of the adhesive composition as the first and second substrates are brought to their desired positions, the adhesive composition and first and second substrates can be laminated without the use of a vacuum.

In all three embodiments, the lamination step would occur in air (e.g. at atmospheric pressure). If a vacuum is needed, the vacuum pressure is greater than about 5,000 Pa, greater than about 10,000 Pa or even greater than about 20,000 Pa. In addition, while the embodiments are described separately, they may be combined to provide additional functionality.

Adhesive Composition

Suitable adhesive compositions to be used with the method of the present invention are liquid compositions that are non-sag in nature and exhibit a solid like behavior at little to no shear while being flowable during the coating process when an appropriate amount of shear is applied. Herein, non-sag refers to the property that the adhesive composition exhibits no or very little flow under zero or near-zero shear stress conditions. In one embodiment, the non-sagging adhesive composition has high viscosity e.g. 16000 to 50000 cps (or mPa·s), and has thixotropic behavior. In one embodiment, the adhesive composition has a viscosity of at least about 100 Pa·s at 0.01 s$^{-1}$ and less than about 50 Pa-s at 1-10 s$^{-1}$. In some embodiments, the adhesive layer may be formed from an adhesive composition having thixotropic properties. Thixotropic adhesives are characterized in that they decrease in viscosity (shear thin) when subjected to a shearing stress over a given period of time with subsequent recovery or partial recovery of viscosity when the shearing stress is decreased or removed. The advantage of the thixotropic property is that the adhesive composition can be dispensed easily by such processes as needle dispensing, due to the rapid decrease in viscosity under high shear rate conditions. An advantage of an adhesive exhibiting thixotropic behavior compared to an adhesive exhibiting high viscosity is that high viscosity adhesives are difficult to dispense and to cause to flow during the squeegee or rolling process, whereas the adhesives exhibiting thixotropic behavior can be dispensed and will flow under shear. In one embodiment, the adhesive composition has a thixotropic index (ratio of viscosities at 0.01 s$^{-1}$ and 10 s$^{-1}$) of greater than about 2, particularly greater than about 3 and more particularly greater than about 4. Adhesive compositions can be made thixotropic by adding particles to the compositions. In some embodiments, fumed silica in an amount of from about 2 to about 10 wt. % or from about 3.5 to about 7 wt. % is added to impart thixotropic properties to a liquid adhesive.

In some embodiments, any adhesive composition having a viscosity of no more than 30 Pa·s, particularly between about 2 and about 30 Pa·s and more particularly between about 5 and about 20 Pa·s at a shear rate of 1 to 10 sec$^{-1}$ can be combined with a thixotropic agent to form an optically clear adhesive having thixotropic properties suitable for stencil printing. The efficiency of the thixotropic agent and the optical properties depend on the composition of the liquid optically clear adhesive and its interaction with the thixotropic agent. For example, in the case of associative thixotropes or hydrophilic silica, the presence of highly polar monomers such as acrylic acid, acid or hyxdroxyl containing monomers or oligomers, may disrupt the thixotropic or optical performance.

In some embodiments, the viscosities of the adhesive composition may be controlled at two or more different shear rates.

The adhesive composition used herein experiences an evolution of shear rates during the printing process as modeled by J. Kevra, "Estimation of Shear Rates During Rolling in the Screening and Stenciling Process", *The International Journal for Hybrid Microelectronics*, Vol. 12, No. 4, pp. 188-194 (1989). For example, the adhesive composition may experience shear rates of zero to a few sec$^{-1}$ as the adhesive composition is first applied to the stencil. The maximum shear rate of several hundred to about 1000 sec$^{-1}$ happens when the adhesive composition is forced through the stencil during the squeegee or rolling process. At these high shear rates, the viscosity of the adhesive composition is low and readily flows. As the adhesive composition exits the stencil onto the first substrate, it experiences a rapid decrease in shear rate and eventually reaches a zero shear rate condition at which time the viscosity has again built up rapidly to allow the adhesive composition to be in a non-sag condition.

It has been found that it is possible to achieve a non-sag adhesive by controlling the viscosities of the adhesive composition at least at two different shear rates. More specifically, for example, the adhesive composition is characterized in that it has a viscosity of 18 Pa·s to 140 Pa·s at a shear rate of 1 sec$^{-1}$ and a viscosity of 200 Pa·s to 4200 Pa·s at 0.01 sec$^{-1}$. When the adhesive composition has a viscosity of 18 Pa·s to 140 Pa·s at a shear rate of 1 sec$^{-1}$, the adhesive composition may be deposited on the stencil and squeegee through the openings of the stencil as described above.

Furthermore, because the adhesive composition of the present disclosure has a viscosity of 200 Pa·s to 4200 Pa·s at a shear rate of 0.01 sec$^{-1}$, the adhesive composition retains its non-sag behavior after exiting the openings of the stencil onto the first substrate.

The above viscosities values were determined at 25° C. using an AR2000 Rheometer (manufactured by TA Instruments) equipped with a 40 mm diameter×1° cone and scanned over the shear rate range of 0.001 to 100 sec$^{-1}$.

In one embodiment, the adhesive layer has a viscosity of between about 2 and about 30 Pa·s and particularly between about 5 and about 20 Pa·s at 25° C. and a shear rate of 10 sec$^{-1}$. In one embodiment, the adhesive layer has a viscosity of between about 700 and about 10,000 Pa·s and particularly between about 1,000 and about 8,000 Pa·s at 25° C. and a shear rate of 0.01 sec$^{1}$. In one embodiment, the adhesive layer has a viscosity of between about 18 Pa·s and about 140 Pa·s and particularly between about 30 Pa·s and about 100 Pa·s at 25° C. and shear rate 1 sec$^{-1}$.

In some embodiments, the adhesive composition has a displacement creep of about 0.1 radians or less when a stress of 10 Pa is applied to the adhesive for 2 minutes. In general, displacement creep is a value determined by using an AR2000 Rheometer manufactured by TA Instruments and a 40 mm diameter×1° cone at 25° C., and is defined as the rotational angle of the cone when a stress of 10 Pa is applied to the adhesive. The displacement creep is related to the ability of the thixotropic adhesive layer to resist flow, or sag, under very low stress conditions, such as gravity and surface tension.

In some embodiments, the liquid optically clear adhesive has a delta of 45 degrees or less, particularly 42 or less, particularly 35 degrees or less and more particularly 30 degrees or less when a torque of 80 microN·m is applied at a frequency of 1 Hz in a cone and plate rheometer. Delta is the phase lag between stress and strain where an oscillatory force (stress) is applied to a material and the resulting displacement (strain) is measured. Delta is assigned units of degrees. The delta is related to the "solid" behavior of the thixotropic adhesive layer or its non-sag property at very low oscillatory stress.

The adhesive layer also has the ability to regain its non-sag structure within a short amount of time after passing underneath equipment, such as a squeegee in stencil printing applications. In one embodiment, the recovery time of the adhesive layer is less than about 5 minutes, particularly less than 2 minutes, particularly less than 60 seconds, particularly less than about 30 seconds, and more particularly less than about 10 seconds to reach a delta of 35 degrees after a torque of about 1000 microN·m is applied for about 60 seconds at a frequency of 1 Hz and immediately followed by a torque of 80 microN·m at a frequency of 1 Hz. The ability of the adhesive composition to regain its non-sag structure within a certain time frame after the coating process ensures that dimensional tolerances of the coating area are maintained.

Non-sag adhesive compositions may include filler particles known to produce thixotropic behavior. Suitable fillers according to the present disclosure include clays, a variety of forms of silica and aluminum oxide depending upon particle size and surface treatment, and organic fillers such as cellulose, castor-oil wax, and polyamide-containing fillers. Particulate fillers imparting thixotropy include, but are not limited to: fumed silica, fumed aluminum oxide and clay. Examples of suitable fumed silicas include, but are not limited to: AEROSIL 200; and AEROSIL R805 (both available from Evonic Industries); CAB-O-SIL TS 610; and CAB-O-SIL T 5720 (both available from Cabot Corp.), and HDK H2ORH available from Wacker Chemie AG. An example of a suitable fumed aluminium oxide include, but is not limited to, AEROXIDE ALU 130 (available from Evonik, Parsippany, N.J.). An example of a suitable clay includes, but is not limited to, GARAMITE 1958, available from Southern Clay Products. Fumed silicas generally represent the most preferred fillers although this is somewhat formulation dependent. The adhesive composition may comprise from about 2 to about 10 wt. % and particularly from about 3.5 to about 7 wt. %, of the thixotropic material.

When a non-thixotropic liquid is used, the flow may be prevented by a frame cure or full pre-cure of the substrate. The frame cure involves quickly passing a high powered LED around the perimeter of the adhesive coated on the substrate. In one embodiment, the LED has a peak illumination power of greater than about 25 mW/cm$^2$, particularly greater than about 300 mW/cm$^2$ and more particularly greater than about 4,000 mW/cm$^2$. Using the frame cure will allow the LOCA to become gelled, thereby increasing the viscosity and inhibiting flow.

The adhesive composition used in the present invention are optically clear. As used herein, "optically clear," when used with reference to the first or second substrate or with reference to the adhesive layer means generally that the article has at least 85%, particularly at least 90% transmission over the range of from about 400 nm to about 720 nm, and more particularly at least 92% transmission over the range of from about 400 nm to about 720 nm In one embodiment, the adhesive layer has a transmission of greater than about 85% at 460 nm, greater than about 90% at 530 nm, and greater than 90% at 670 nm as measured by a spectrophotometer or other device capable of measuring percent transmittance. These transmission characteristics provide for uniform transmission of light across the visible region of the electromagnetic spectrum which is important to maintain the color point in full color displays.

The haze portion of the transparency characteristics of the adhesive layer is further defined by the % haze value of the adhesive layer as measured by haze meters such as a HazeGard Plus available from Byk Gardner or an UltraScan Pro available from Hunter Labs. For example, the percent haze of the adhesive composition should be less than about 5%, particularly less than about 2%, and more particularly less than about 1%. These haze characteristics provide for low light scattering which is important to maintain the quality of the output in full color displays.

Although the present invention has been described with reference to preferred embodiments, workers skilled in the art will recognize that changes may be made in form and detail without departing from the spirit and scope of the invention.

What is claimed is:
1. A method of stencil printing comprising:
    printing a layer of non-sag adhesive onto a first substrate;
    adding topography to the layer of non-sag adhesive; and
    contacting the layer of non-sag adhesive with a second substrate, wherein the second substrate initially contacts only about 5% or less of exposed surface area of the layer of non-sag adhesive.
2. The method of claim 1, wherein contacting the layer of non-sag adhesive with the second substrate occurs at atmospheric pressure.
3. The method of claim 1, wherein printing the layer of non-sag adhesive onto the first substrate comprises printing the layer having varying heights.
4. The method of claim 1, wherein adding topography comprises adding a second amount of non-sag adhesive at discrete locations.
5. The method of claim 1, wherein adding topography comprises passing a draw bar over the layer of non-sag adhesive, forming channels or grooves in the layer of non-sag adhesive.
6. The method of claim 1, wherein the non-sag adhesive has a viscosity of at least 100 Pa·s at 0.01 s$^{-1}$ and less than about 50 Pa·s at between 1 and 10 s$^{-1}$.
7. The method of claim 1, wherein the second substrate initially contacts only about 2% or less of the exposed surface area of the layer of non-sag adhesive.
8. The method of claim 1, wherein the non-sag adhesive is thixotropic.
9. The method of claim 1, wherein the non-sag adhesive is a liquid optically clear adhesive.
10. A method of stencil printing comprising:
    printing a layer of a non-sag, liquid optically clear adhesive onto a first substrate;
    adding topography to the layer of the non-sag, liquid optically clear adhesive, wherein the topography comprises about 5% or less of an exposed surface area of the layer of the non-sag, liquid optically clear adhesive; and
    contacting the layer of the non-sag, liquid optically clear adhesive with a second substrate.
11. The method of claim 10, wherein the second substrate initially contacts only about 2% or less of the exposed surface area of the layer of the non-sag, liquid optically clear adhesive.
12. The method of claim 10, wherein the non-sag, liquid optically clear adhesive has a viscosity of at least 100 Pa·s at 0.01 s$^{-1}$ and less than about 50 Pa·s at between 1 and 10 s$^{-1}$.
13. The method of claim 10, wherein the non-sag, liquid optically clear adhesive is thixotropic.
14. The method of claim 10, wherein printing the layer of the non-sag, liquid optically clear adhesive onto the first substrate comprises printing the layer having varying heights.
15. The method of claim 10, wherein adding topography comprises adding a second amount of non-sag, liquid optically clear adhesive at discrete locations.
16. The method of claim 10, wherein adding topography comprises passing a draw bar over the layer of the non-sag, liquid optically clear adhesive to create channels or grooves in the layer of adhesive.

* * * * *